US009259711B2

(12) United States Patent
Long et al.

(10) Patent No.: US 9,259,711 B2
(45) **Date of Patent: *Feb. 16, 2016**

(54) CATALYST FOR UPGRADING INFERIOR ACID-CONTAINING CRUDE OIL, PROCESS FOR MANUFACTURING THE SAME, AND APPLICATION THEREOF

(75) Inventors: Jun Long, Beijing (CN); Jiushun Zhang, Beijing (CN); Huiping Tian, Beijing (CN); Yuxia Zhu, Beijing (CN)

(73) Assignees: CHINA PETROLEUM & CHEMICAL CORPORATION, Beijing (CN); RESEARCH INSTITUTE OF PETROLEUM PROCESSING SINOPEC, Beijing (CN)

( * ) Notice: Subject to any disclaimer, the term of this patent is extended or adjusted under 35 U.S.C. 154(b) by 1487 days.

This patent is subject to a terminal disclaimer.

(21) Appl. No.: 12/993,637

(22) PCT Filed: Jan. 9, 2009

(86) PCT No.: PCT/CN2009/000031

§ 371 (c)(1), (2), (4) Date: Feb. 14, 2011

(87) PCT Pub. No.: WO2009/140847

PCT Pub. Date: Nov. 26, 2009

(65) Prior Publication Data

US 2011/0139682 A1 Jun. 16, 2011

(30) Foreign Application Priority Data

May 20, 2008 (CN) .......................... 2008 1 0112002
May 29, 2008 (CN) .......................... 2008 1 0113393

(51) Int. Cl.

| | |
|---|---|
| ***C10G 11/04*** | (2006.01) |
| ***B01J 21/14*** | (2006.01) |
| ***B01J 21/16*** | (2006.01) |
| ***B01J 23/02*** | (2006.01) |
| ***B01J 35/10*** | (2006.01) |
| ***B01J 37/03*** | (2006.01) |
| ***B01J 37/30*** | (2006.01) |
| ***C10G 29/04*** | (2006.01) |
| ***C10G 45/04*** | (2006.01) |

(52) U.S. Cl.

CPC *B01J 21/14* (2013.01); *B01J 21/16* (2013.01); *B01J 23/02* (2013.01); *B01J 35/1019* (2013.01); *B01J 35/1042* (2013.01); *B01J 35/1047* (2013.01); *B01J 35/1061* (2013.01); *B01J 37/03* (2013.01); *B01J 37/30* (2013.01); *C10G 11/04* (2013.01); *C10G 29/04* (2013.01); *C10G 45/04* (2013.01)

(58) Field of Classification Search

USPC ........... 208/97, 99, 120.01, 120.15, 121, 122, 208/251 R, 253, 263, 299

See application file for complete search history.

(56) References Cited

U.S. PATENT DOCUMENTS

| | | | | |
|---|---|---|---|---|
| 5,576,258 | A | 11/1996 | Chamberlain et al. | |
| 5,883,035 | A | 3/1999 | Yang | |
| 5,891,325 | A | 4/1999 | Bearden et al. | |
| 2008/0058573 | A1 * | 3/2008 | Zanthoff et al. | 585/649 |

FOREIGN PATENT DOCUMENTS

| | | | |
|---|---|---|---|
| CN | 1122111 | A | 5/1996 |
| CN | 1827744 | A | 9/2006 |
| CN | 1978593 | A | 6/2007 |
| JP | 2-48411 | A | 2/1990 |
| JP | 2000-119014 | A | 4/2000 |
| JP | 2004-51457 | A | 2/2004 |
| JP | 2007-297224 | A | 11/2007 |
| JP | 2008-55420 | A | 3/2008 |
| WO | 2006/069535 | A1 | 7/2006 |
| WO | 2008/028343 | A1 | 3/2008 |
| WO | 2009/092282 | A1 | 7/2009 |

OTHER PUBLICATIONS

International Search Report dated Apr. 23, 2010.

* cited by examiner

*Primary Examiner* — Elizabeth Wood

(74) *Attorney, Agent, or Firm* — Scully Scott Murphy & Presser

(57) ABSTRACT

The present invention relates to a mesopore material of a catalyst for upgrading acid-containing crude oil. Said mesopore material is an amorphous material containing alkaline earth oxide, silica and alumina, and has an anhydrous chemical formula of $(0\text{-}0.3)Na_2O.(1\text{-}50)MO.(6\text{-}58)Al_2O_3.(40\text{-}92)SiO_2$, based on the weight percent of the oxides, wherein M is one or more selected from Mg, Ca and Ba. Said mesopore material has a specific surface area of 200-400 $m^2/g$, a pore volume of 0.5-2.0 ml/g, an average pore diameter of 8-20 nm, and a most probable pore size of 5-15 nm. The present invention further relates to a process for manufacturing said mesopore material and the use thereof. The catalyst prepared from the mesopore material provided in the present invention is suitable for the catalytic upgrading of inferior acid-containing crude oil and for the removal of organic acids, carbon residues and metals in the crude oil, and thus has very good economic benefits.

5 Claims, No Drawings

CATALYST FOR UPGRADING INFERIOR ACID-CONTAINING CRUDE OIL, PROCESS FOR MANUFACTURING THE SAME, AND APPLICATION THEREOF

TECHNICAL FIELD

The present invention relates to a catalytic material for upgrading hydrocarbon oil and a process for preparing the same, as well as the application of the catalyst prepared from such catalytic material in the pretreatment and catalytic upgrading of inferior acid-containing crude oil. More specifically, the present invention relates to a catalytic material for catalytically upgrading inferior acid-containing crude oil in the absence of hydrogen, and a process for preparing the same.

BACKGROUND OF THE INVENTION

With the increasing requirements on crude oil, crude oil is continuously explored; light crude oil resource gradually decreases and the ratio of heavy and inferior acid-containing crude oil is increasing. The quality of the world crude oil generally tends to become heavy and inferior, and the output of crude oil having high sulfur content, high total acid number, high metal content and high carbon residue is rapidly increased. It is predicted that the world output of inferior acid-containing crude oil will be increased from currently 16% to 20% in 2010. Based on this background, to process inferior acid-containing crude oil with the catalytically cracking apparatus is the problem which we have to confront.

Inferior acid-containing crude oil has low hydrogen content, high content of metals, such as Ni, V and the like, high content of condensed aromatics, high content of S and N, high density and high conradson carbon number, so that it is difficult to crack said crude oil. Since it is difficult to crack the inferior acid-containing crude oil, the catalytic cracking equipment for processing such crude oil is forced to throw off a great quantity of slurry, with the result that the total yield of liquid products (liquefied gas, gasoline, diesel oil) decreases. Higher Ni and V content renders that hydrogen content in the products are greatly increased, which has strong destruction on the catalyst. In order to maintain the balance activity of the catalyst, the unit consumption of the catalyst will be certainly increased. Moreover, the addition of the metal deactivator is also difficult to achieve the desirable effect. Thus it is advisable that such inferior acid-containing crude oil should be upgraded or pretreated before processing, so as to increase the hydrogen/carbon ratio of the crude oil and reduce the metal content and conradson carbon number.

In order to improve the properties of crude oil and to reduce the conradson carbon number and metal content, a non-catalytic pretreating process comprises introducing crude oil having a substantial conradson carbon number and metals content into the demetallization and decarbonizing zone of the fluidized catalytic cracking apparatus to come into contact with an inert fluidizable solid particles. Under the conditions of at least 480° C. and less than 2 s of the contact time, high boiling components of the crude oil and metals are deposited on the inert fluidizable solid particles. These particles are recycled into a burning zone to remove combustible deposit. Inert particles from which combustible deposit is burned away are recycled into demetallization and decarbonizing zone to come into contact with crude oil again. The crude oil treated with such process can be used as the feedstock of FCC.

Recently, the process of inferior acid-containing crude oil is gradually drawing increasing attention. The amount of highly acidic crude oil in the international market is gradually increased. In 2005, the world output of highly acidic crude oil occupied 5.5% of the total output of crude oil. Acidic substances in crude oil are inorganic acids, phenols, mercaptans, aliphatic carboxylic acids, naphthenic acids and the like, wherein naphthenic acids are the uppermost acidic oxides in crude oxide and occupy about 90 wt % of acidic oxides. Studies show that crude oil having a total acid number of 0.5 mgKOH/g will result in significant corrosion of the refining equipments. Thus crude oil having a total acid number of greater than 0.5 mgKOH/g is called as highly acidic crude oil. During the processing of crude oil, naphthenic acids in crude oil may directly react with iron, thereby causing corrosion of furnace tube, heat exchanger and other refining equipments. In addition, naphthenic acids may react with the protective film FeS on the petrolatum equipments to enable the metal equipment to expose new surface and to be subjected to new corrosion. For general petroleum products, such as gasoline, diesel oil and kerosene, there are always the requirements on the acid number in the quality indexes thereof. Overhigh acid number will bring the same corrosion problem to the final customers.

The processes introduced in the documents and patents further include the physical adsorption process, the thermal treatment, the thermal cracking process and the catalytic hydrogenation process. These processes, however, are not applied in the practical application.

Physical adsorption process—In the presence of an adsorbent, acid-containing crude oil or fraction is thermally treated at 250-350° C. to adsorb and transfer acid-containing compounds in crude oil, wherein the adsorbent may be a waste catalytically cracking catalyst. Alternatively, the blend of crude oil and alkaline earth metal oxides is heated at 100-300° C. to enable said alkaline earth metal oxides to react with organic acids or sulfides in crude oil, so as to produce the precipitates of alkaline earth metal carbonates and alkaline earth metal sulfides. After separation, crude oil from which naphthenic acids and sulfides are removed is obtained.

Catalytic hydrogenation process—Under the conditions of a hydrogen partial pressure of 2-3 Mpa and a reaction temperature of 250° C., acid-containing crude oil is hydrotreated by using Ni—Mo or Ni—Co hydrorefining catalyst in which the carrier is alumina, so as to decompose naphthenic acids to CO, $CO_2$, $H_2O$ and petroleum hydrocarbons having a low molecular weight, and to reduce the total acid number of crude oil from 2.6 mgKOH/g to 0.15 mgKOH/g. Although catalytic hydrogenation process has a better deacidification effect, it needs a high pressure-resistant and high temperature-resistant apparatus, and hydrogen gas. Said apparatus thus requires a high apparatus investment and a large technological investment. In the absence of hydrogen gas, highly acidic crude oil can be treated with Ni—Mo or Ni—CO hydrorefining catalyst at 285-345° C., so as to reduce the total acid number of crude oil from 4.0 mgKOH/g to 1.8 mgKOH/g.

Thermal treatment and thermal cracking process (including catalytically thermal cracking)—U.S. Pat. No. 5,891,325 discloses a process for reducing total acid number of crude oil by a multistage thermal reaction. The thermal reaction in said process comprises a plurality of stages, wherein each stage of the thermal reaction decomposes at a certain temperature and pressure a portion of petroleum acids, and produces volatile organic acids, petroleum hydrocarbons and non-volatile petroleum hydrocarbons. While the reaction is carried out, said process further comprises sweeping the reaction system with an inert gas, collecting volatile components, neutralizing most of organic acids with a basic salt of a Group HA metal, such as CaO, $Ca(OH)_2$, $CaCO_3$, MgO and the like, to produce volatile petroleum hydrocarbons. Then said volatile petroleum hydrocarbons and non-volatile petroleum hydrocarbons are blended together to obtain crude oil from which the petroleum acids are removed.

CN1827744A discloses a method for processing crude oil with high total acid number, comprising preheating the crude oil which has a total acid number of more than 0.5 mgKOH/g after the pretreatment and injecting them into the fluidized catalytic cracker to contact the catalyst, and reacting in catalytically cracked reaction condition, naphthenic acid in the crude oil being cracked to be hydrocarbons and $CO_2$, separating the reacted oil gas and the catalyst, in which the oil gas is fed into the subsequent separation system, while the reacted catalyst can be circularly used after stripping and regenerating.

At present, inferior acid-containing crude oil is generally processed by mixing with low acid crude oil. Generally, the total acid number of the mixed crude oil is required to be not more than 0.5 mgKOH/g, so that the blending ratio of acid-containing crude oil is limited to some extent. The higher the total acid number, density and carbon residue of acid-containing crude oil are, the more difficult the processing thereof is.

Contents of the Invention

The object of the present invention is to provide a mesopore material capable of decomposing organic acids in the inferior acid-containing crude oil, particularly in the crude oil having a total acid number of greater than 0.5 mgKOH/g, and adsorbing carbon residues and metals in inferior acid-containing crude oil, so as to upgrade said inferior acid-containing crude oil.

The second object of the present invention is to provide a process for preparing said mesopore material.

The third object of the present invention is to provide a catalyst containing said mesopore material.

The fourth object of the present invention is to provide a process for catalytically upgrading inferior acid-containing crude oil and removing organic acids, carbon residues and metals in crude oil using the catalyst containing the mesopore material above.

The mesopore material provided in the present invention is an amorphous material containing alkaline earth oxide, silica and alumina, with an anhydrous chemical formula of (0-0.3) $Na_2O$.(1-50)MO.(6-58)$Al_2O_3$.(40-92)$SiO_2$, based on the weight percent of the oxides, wherein M is one or more selected from Mg, Ca and Ba, preferably Mg and/or Ca. Said mesopore material has a specific surface area of 200-400 $m^2/g$, a pore volume of 0.5-2.0 ml/g, preferably 1.0-2.0 ml/g, an average pore diameter of 8-20 nm, preferably 10-20 nm, and a most probable pore size of 5-15 nm, preferably 10-15 nm.

In a preferable embodiment, said mesopore material has an anhydrous chemical formula of (0-0.2)$Na_2O$.(2-30)MO.(6-35)$Al_2O_3$.(60-92)$SiO_2$, based on the weight percent of the oxide.

Preferably, said anhydrous mesopore material comprises 0.1-0.2% of $Na_2O$, 60-85% of $SiO_2$ and 6-20% of $Al_2O_3$, based on the weight percent of the oxides.

Preferably, said anhydrous mesopore material comprises 5-30% of MO, based on the weight percent of the oxides.

The process for manufacturing the mesopore material provided in the present invention comprises neutralizing aluminium source, silica source and alkaline earth solution at a temperature ranging from room temperature to 85° C. to form a gel, adjusting the final pH of the gel to 7-9 using acids or alkalies, aging for 1-10 h at a temperature ranging from room temperature to 90° C., removing impurity ions by ammonium exchange of the resulted solid precipitates to obtain an ammonium-exchanged gel, or further drying and calcining.

In the process for preparing the mesopore material provided in the present invention, said aluminium source is one or more selected from the group consisting of aluminium nitrate, aluminium sulfate, aluminum chloride and sodium aluminate; said silica source is one or more selected from the group consisting of water glass, sodium silicate, silicon tetraethyl and silica; said acid is one or more selected from the group consisting of sulfuric acid, hydrochloric acid and nitric acid; and said alkali is one or more selected from the group consisting of ammonia water, potassium hydroxide and sodium hydroxide.

The present invention provides a catalyst for catalytically upgrading inferior acid-containing crude oil catalyst, wherein said catalyst comprises 1-95 wt % of the mesopore material, 0-99 wt % of thermotolerant inorganic oxides and 0-70 wt % of clays, based on the total amount of the catalyst; said mesopore material is an amorphous material containing alkaline earth oxide, silica and alumina mentioned above, wherein each component has an optional content as mentioned before for the mesopore material; M is one or more selected from Mg, Ca and Ba. Said mesopore material has a specific surface area of 200-400 $m^2/g$, a pore volume of 0.5-2.0 ml/g, preferably 1.0-2.0 ml/g, an average pore diameter of 8-20 nm, preferably 10-20 nm, and a most probable pore size of 5-15 nm, preferably 10-15 nm.

Preferably, said catalyst comprises 10-50 wt % of the mesopore material, 10-70 wt % of thermotolerant inorganic oxides and 0-60 wt % of clays, based on the total amount of the catalyst. More preferably, said catalyst comprises 30-50 wt % of the mesopore material, 20-40 wt % of thermotolerant inorganic oxides and 30-50 wt % of clays, based on the total amount of the catalyst.

The process for preparing the catalyst provided in the present invention comprises mixing and slurrying all or a portion of thermotolerant inorganic oxides and/or the precursor thereof and water; adding or not adding clays; adding the mesopore material; drying the obtained slurry and calcining, wherein an acid is added before adding the mesopore material, before or after adding the clays and is aged at a temperature of 30-90° C. for 0.1-10 h; adding the residual thermotolerant inorganic oxides and/or the precursor thereof after aging step; said mesopore material being an amorphous material containing alkaline earth oxide, silica and alumina mentioned above, wherein each component has an optional content as mentioned before for the mesopore material; M being one or more selected from Mg, Ca and Ba, preferably Mg and/or Ca. Said mesopore material has a specific surface area of 200-400 $m^2/g$, a pore volume of 0.5-2.0 ml/g, preferably 1.0-2.0 ml/g, an average pore diameter of 8-20 nm, preferably 10-20 nm, and a most probable pore size of 5-15 nm, preferably 10-15 nm; due to the amount of each component, the final catalyst comprises 1-95 wt % of the mesopore material, 0-99 wt % of thermotolerant inorganic oxides and 0-70 wt % of clays, based on the total amount of the catalyst. More preferably, said catalyst comprises 30-50 wt % of the mesopore material, 20-40 wt % of thermotolerant inorganic oxides and 30-50 wt % of clays, based on the total amount of the catalyst.

The process for upgrading inferior acid-containing crude oil provided in the present invention comprises preheating the crude oil to 100-250° C., introducing into the reactor and contacting with the catalytically upgrading catalyst as mentioned above for the catalytic upgrading, separating the reaction oil and gas and the coked catalyst after the reaction, wherein the separated reaction gas and oil is subjected to the subsequent separation to obtain a portion of light products and the deacidified, decarburized and demetallized crude oil; and the separated catalyst is recycled after regeneration by stripping and charring.

Preferably, said catalytic upgrading is conducted at a reaction temperature of 300-600° C., a reaction pressure of 0.15-0.4 Mpa, a weight hourly space velocity of 1-150 $h^{-1}$, and a mass ratio of 1-30 of the catalyst to the raw hydrocarbon oil. More preferably, said catalytic upgrading is conducted at a reaction temperature of 350-520° C., a reaction pressure of 0.15-0.35 Mpa, a weight hourly space velocity of 1-100 $h^{-1}$, and a mass ratio of 2-15 of the catalyst to the hydrocarbon oil Preferably, said reactor is a riser reactor and/or a fluidized bed reactor.

The beneficial effects of the catalyst for catalytically upgrading acid-containing crude oil and the process for preparing the same are reflected as follows.

The catalyst provided in the present invention contains a mesopore material containing alkaline earth oxide, silica and alumina, having a specific surface area of 200-400 $m^2/g$, a pore volume of 0.5-2.0 ml/g, and an average pore diameter of 8-20 nm. The presence of alkaline earth oxide is advantageous to promoting the catalytic decomposition of organic acids in inferior acid-containing crude oil. Meanwhile, high specific surface area, great pore volume and mesopore diameter are in favor of the entry and adsorption of heavy-metal chelate complex and resin in inferior acid-containing crude oil. Thus the catalytically upgrading catalyst provided by the present invention may effectively reduce the total acid number, carbon residue and metal content of inferior acid-containing crude oil, and improve the quality of crude oil so as to be useful as the feedstock for catalytic cracking.

The beneficial effects of the process for catalytically upgrading acid-containing crude oil provided in the present invention over the prior art are reflected as follows.

Inferior acid-containing crude oil has a higher total acid number, so that the apparatus will be seriously eroded during the atmospheric vacuum distillation process. Due to high carbon residue and metal content, inferior acid-containing crude oil cannot be directly used as the feedstock for catalytic cracking. The process for catalytically upgrading inferior acid-containing crude oil provided in the present invention can be used to decompose organic acids in crude oil, to convert carboxyl groups in naphthenic acids into carbon monoxide or carbon dioxide, and to convert alkyl groups into hydrocarbon substances, so as to achieve a deacidification rate of greater than 90% and reduce the total acid number of crude oil. Meanwhile, the carbon residue and metal content are reduced by the adsorption of the catalyst, so as to improve the quality of crude oil. Crude oil upgraded with the process provided in the present invention can be directly used as the feedstock for catalytic cracking or for the atmospheric vacuum apparatus, so as to reduce the investment in the apparatus and the cost for the apparatus anticorrosion and to increase the economic benefits.

MODE OF CARRYING OUT THE INVENTION

The mesopore material provided in the present invention is an amorphous material containing alkaline earth metal oxide, silica and alumina, having an anhydrous chemical formula of, based on the weight percent of the oxides, (0-0.3)$Na_2O$.(1-50)MO.(6-58)$Al_2O_3$.(40-92)$SiO_2$, preferably (0-0.2)$Na_2O$.(2-30)MO.(6-35)$Al_2O_3$.(60-92)$SiO_2$.

Said alkaline earth metal M is one or more selected from Mg, Ca and Ba, preferably Mg and/or Ca. Preferably, said anhydrous mesopore material comprises 0.1-0.2% of $Na_2O$, 60-85% of $SiO_2$ and 6-20% of $Al_2O_3$, based on the weight percent of the oxides. Preferably, said anhydrous mesopore material comprises 5-30% of MO, based on the weight percent of the oxides.

The catalytically upgrading catalyst provided in the present invention comprises said mesopore material, and optionally thermotolerant inorganic oxides and clays. Based on the total amount of the catalyst, said mesopore material is in an amount of 1-95 wt %; said thermotolerant inorganic oxide is in an amount of 0-99 wt %; and said clay is in an amount of 0-70 wt %. Preferably, said mesopore material is in an amount of 10-50 wt %; said thermotolerant inorganic oxide is in an amount of 10-70 wt %; and said clay is in an amount of 0-60 wt %.

In the catalyst provided in the present invention, said thermotolerant inorganic oxide is one or more thermotolerant inorganic oxides as matrix and binder component of cracking catalyst, such as one or more selected from the group consisting of alumina, silica and amorphous silica-alumina. These thermotolerant inorganic oxides are well known by those skilled in the art.

Said clay is one or the mixture of more selected from the clays as active components of the cracking catalyst, such as kaolin, halloysite, montmorillonite, diatomite, endellite, saponite, rectorite, sepiolite, attapulgite, hydrotalcite and bentonite, preferably one or the mixture of more selected from kaolin, halloysite and montmorillonite. These clays are well known by those skilled in the art.

In said catalyst, said thermotolerant inorganic oxide is preferably $SiO_2$ or $Al_2O_3$, and said clay is preferably kaolin.

In the process for preparing the catalyst provided in the present invention, all or a portion of thermotolerant inorganic oxides and/or the precursor thereof may be added before aging step. In order to make the catalyst have better attrition resistance ability, a portion of thermotolerant inorganic oxides and/or the precursor thereof may be added preferably before aging step, and the residual thermotolerant inorganic oxides and/or the precursor thereof are/is added after aging step, wherein the portion added firstly and the portion added later enables the weight ratio of the thermotolerant inorganic oxides added firstly and the thermotolerant inorganic oxides added later to be 1:0.1-10 in catalyst, preferably 1:0.1-5.

In the process for preparing the catalyst provided in the present invention, said clay may be added before or after aging step. The order of adding said clay has no effect on the performance of the catalyst.

In the process for preparing the catalyst provided in the present invention, an acid is further added before adding the mesopore material, before or after adding the clays, to adjust the pH of the slurry to 1-5. Then the slurry is aged at a temperature of 30-90° C. for 0.1-10 h. Said acid is one or more selected from the group consisting of soluble inorganic acids and organic acids, preferably one or the mixture of more selected from the group consisting of hydrochloric acid, nitric acid, phosphoric acid and carboxylic acid having a carbon molecule number of 1-10. The amount of the acid enables the pH of the slurry to range from 1-5, preferably 1.5-4.

Said aging temperature ranges from 30 to 90° C., preferably from 40 to 80° C. Aging lasts from 0.1 to 10 h, preferably 0.5 to 8 h.

In the process for preparing the catalyst provided in the present invention, the precursor of said thermotolerant inorganic oxide represents one or more substances capable of forming said thermotolerant inorganic oxide during the preparation of the catalyst. For example, the precursor of alumina may be selected from hydrated alumina and/or alumina sol, wherein said hydrated alumina is one or more selected from the group consisting of boehmite, pseudo-boehmite, aluminum trihydrate and amorphous aluminium hydroxide. The precursor of silica may be one or more selected from the group consisting of silica sol, silica gel and water glass. The precursor of amorphous silica-alumina may be one or more selected from the group consisting of silica-alumina sol, mixture of silica sol and alumina sol, and silica-alumina gel. The precursors of these thermotolerant inorganic oxides are well known by those skilled in the art.

Due to the amount of each component, the final catalyst in the process for preparing the catalyst provided in the present invention comprises 1-95 wt % of the mesopore material, 0-99 wt % of thermotolerant inorganic oxides and 0-70 wt % of clays, based on the total amount of the catalyst. Preferably, the final catalyst in the process for preparing the catalyst provided in the present invention comprises 10-50 wt % of the mesopore material, 10-70 wt % of thermotolerant inorganic oxides and 0-60 wt % of clays, based on the total amount of the catalyst. More preferably, the final catalyst in the process for preparing the catalyst provided in the present invention comprises 30-50 wt % of the mesopore material, 20-40 wt % of thermotolerant inorganic oxides and 30-50 wt % of clays, based on the total amount of the catalyst.

In the process for preparing the catalyst of the present invention, the methods and conditions for drying the slurry are well known by those skilled in the art. For example, drying may be air drying, baking, forced air drying or spray drying, preferably spray drying. The drying temperature may range from room temperature to 400° C., preferably from 100 to 350° C. In order to be convenient for spray drying, the solid content of the slurry before drying is preferably 10-50 wt %, more preferably 20-50 wt %.

The calcining conditions after drying said slurry are also well known by those skilled in the art. Generally, the calcining temperature after drying said slurry ranges from 400 to 700° C., preferably from 450 to 650° C.; the calcination lasts at least 0.5 h, preferably from 0.5 to 100 h, more preferably from 0.5 to 10 h.

The process for manufacturing the mesopore material of the present invention comprises neutralizing aluminium source, silica source and alkaline earth solution at a temperature ranging from room temperature to 85° C. to form a gel, adjusting the final pH of the gel to 7-9 using acids or alkalies, aging for 1-10 h at a temperature ranging from room temperature to 90° C., removing impurity ions by ammonium exchange of the resulted solid precipitates to obtain an ammonium-exchanged gel, or further drying and calcining Said aluminium source is one or the mixture of more selected from the group consisting of aluminium nitrate, aluminium sulfate, aluminum chloride and sodium aluminate; said silica source is one or the mixture of more selected from the group consisting of water glass, sodium silicate, silicon tetraethyl and silica; said acid is one or the mixture of more selected from the group consisting of sulfuric acid, hydrochloric acid and nitric acid; and said alkali is one or the mixture of more selected from the group consisting of ammonia water, potassium hydroxide and sodium hydroxide According to the weight ratio of precipitate (dry basis): ammonium salt:$H_2O$=1:(0.1-1):(10-30), said ammonium exchange used therein comprises exchanging the aged solid precipitates at a temperature ranging from room temperature to 100° C. with one to three times, each for 0.3-1 h until the sodium content in the precipitates (dry basis) is lower than 0.2 wt % Ammonium salt used in the exchange is any one selected from the group consisting of ammonium chloride, ammonium nitrate, ammonium carbonate and ammonium bicarbonate.

Said mesopore material may be added in a gel form during the preparation of the catalyst, or in the form of a dried or calcined solid. Moreover, the adding manner of said mesopore material has no effect on the performance of the catalyst.

The catalyst provided in the present invention is suitable for upgrading crude oil having a total acid number of greater than 0.5 mgKOH/g and a conradson carbon number of greater than 3 wt %. Preferably, crude oil having a total acid number of greater than 1 mgKOH/g, a conradson carbon number of greater than 5 wt %, a Ni content of greater than 10 ppm, a Fe content of greater than 10 ppm and a Ca content of greater than 10 ppm is upgraded with the catalyst provided in the present invention, which can effectively reduce the total acid number, carbon residue and heavy metal content of acid-containing crude oil and improve the quality of crude oil so as to be used as the feedstock for catalytic cracking and have very good economic benefits.

The following examples are provided to further explain the present invention, but not to limit the present invention thereby. The anhydrous chemical formula of the mesopore material is obtained by the determination of the element composition thereof using X-ray fluorescent spectrometry and then the conversion.

EXAMPLES

The materials used in the examples and comparative examples are as follows:

- hydrochloric acid from Beijing Chemical Works, chemically pure, having a concentration of 36-38 wt %;
- sodium water glass commercially available, containing 26.0 wt % of $SiO_2$ and having a module of 3.2;
- halloysite from Suzhou Kaolin Company, having a solid content of 74.0 wt %;
- pseudo-boehmite, an industrial product from Shandong Aluminium Plant, having a solid content of 62.0 wt %;
- alumina sol, a product from Sinopec Catalyst Company Qilu Division, containing 21.5 wt % of $Al_2O_3$.

Examples 1-6 show that the present invention provides the catalyst for catalytically upgrading inferior crude oil containing no thermotolerant inorganic oxide and containing no clay, as well as the process for preparing the same.

Example 1

1750 g of water glass solution in a concentration of 4 wt % (based on $SiO_2$) was added to a beaker. Under the stirring condition, 350 g of sodium aluminate solution in a concentration of 4 wt % (based on $Al_2O_3$), 150 g of aluminium sulfate solution in a concentration of 4 wt % (based on $Al_2O_3$), and 250 g of calcium chloride solution in a concentration of 4 wt % (based on CaO) were added to the aforesaid water glass solution at the same time, and then heated to 80° C. and aged for 4 h Ammonium ion exchange was conducted to obtain a mesopore material in a gel state, which is abbreviated to be N1.

Ammonium ion exchange: according to the weight ratio of precipitate (dry basis):ammonium salt:$H_2O$=1:0.8:15, ammonium ion exchange of the precipitates was conducted with $NH_4Cl$ solution twice at 60° C. to remove sodium ions therein, each for 0.5 h. After each exchange, washing filtration was conducted.

N1 was then dried at 120° C. for 15 h, and calcined at 600° C. for 3 h to obtain the upgrading catalyst containing 100 wt % of the mesopore material, which is abbreviated to be C1. The element analysis weight chemical formula of such sample is $0.2Na_2O.9.8CaO.19.8Al_2O_3.70.2SiO_2$, and the physicochemical parameters thereof, such as specific surface, pore volume and the like, are listed in Table 1.

Example 2

125 g of calcium chloride solution in a concentration of 4 wt % (based on CaO) was added to 400 g of aluminium sulfate solution in a concentration of 2.5 wt % (based on $Al_2O_3$). Under the stirring condition, the aforesaid mixed solution was added to 1700 g of water glass solution in a concentration of 5 wt % (based on $SiO_2$), and then heated to 80° C. and aged for 4 h Ammonium ion exchange was conducted according to the method in Example 1 to obtain a mesopore material in a gel state, which is abbreviated to be N2. N2 was then dried at 120° C. for 15 h, and calcined at 600° C. for 3 h to obtain the upgrading catalyst containing 100 wt % of the mesopore material, which is abbreviated to be C2. The element analysis weight chemical formula of such sample is $0.1Na_2O.5.1CaO.9.8Al_2O_3.85.0SiO_2$, and the physicochemical parameters thereof, such as specific surface, pore volume and the like, are listed in Table 1.

Example 3

500 g of magnesium sulfate solution in a concentration of 4 wt % (based on MgO) was added to a beaker. Under the stirring condition, 1300 g of water glass solution in a concentration of 5 wt % (based on $SiO_2$) was added to the aforesaid magnesium sulfate solution, and 500 g of sodium aluminate solution in a concentration of 3 wt % (based on $Al_2O_3$) was further added therein. The aforesaid mixed solution was then heated to 80° C. and aged for 4 h Ammonium ion exchange was conducted according to the method in Example 1 to obtain a mesopore material in a gel state, which is abbreviated to be N3. N3 was then dried at 120° C. for 15 h, and calcined at 600° C. for 3 h to obtain the upgrading catalyst containing 100 wt % of the mesopore material, which is abbreviated to be C3. The element analysis weight chemical formula of such sample is $0.1Na_2O.21.5MgO.12.3Al_2O_3.66.1SiO_2$, and the physicochemical parameters thereof, such as specific surface, pore volume and the like, are listed in Table 1.

Example 4

1210 g of water glass solution in a concentration of 5 wt % (based on $SiO_2$) was added to a beaker. Under the stirring condition, 400 g of sodium aluminate solution in a concentration of 5 wt % (based on $Al_2O_3$), 300 g of aluminium sulfate solution in a concentration of 5 wt % (based on $Al_2O_3$) and 450 g of barium nitrate solution in a concentration of 1 wt % (based on BaO) were added to the aforesaid water glass solution, and heated to 80° C. and aged for 4 h Ammonium ion exchange was conducted according to the method in Example 1 to obtain a mesopore material in a gel state, which is abbreviated to be N4. N4 was then dried at 120° C. for 15 h, and calcined at 600° C. for 3 h to obtain the upgrading catalyst containing 100 wt % of the mesopore material, which is abbreviated to be C4. The element analysis weight chemical formula of such sample is $0.1Na_2O.4.5BaO.34.8Al_2O_3.60.6SiO_2$, and the physicochemical parameters thereof, such as specific surface, pore volume and the like, are listed in Table 1.

Example 5

750 g of magnesium sulfate solution in a concentration of 4 wt % (based on MgO) was added to a beaker. Under the stirring condition, 1600 g of water glass solution in a concentration of 4 wt % (based on $SiO_2$) was added to the aforesaid magnesium sulfate solution, and 150 g of sodium aluminate solution in a concentration of 4 wt % (based on $Al_2O_3$) was further added therein. The aforesaid mixed solution was then heated to 80° C. and aged for 4 h. Ammonium ion exchange was conducted according to the method in Example 1 to obtain a mesopore material in a gel state, which is abbreviated to be N5. N5 was then dried at 120° C. for 15 h, and calcined at 600° C. for 3 h to obtain the upgrading catalyst containing 100 wt % of the mesopore material, which is abbreviated to be C5. The element analysis weight chemical formula of such sample is $0.1Na_2O.29.8MgO.6.2Al_2O_3.63.9SiO_2$, and the physicochemical parameters thereof, such as specific surface, pore volume and the like, are listed in Table 1.

Example 6

300 g of barium nitrate solution in a concentration of 1 wt % (based on BaO) was added to 200 g of aluminium sulfate solution in a concentration of 3 wt % (based on $Al_2O_3$). Under the stirring condition, the aforesaid mixed solution was added to 1800 g of water glass solution in a concentration of 5 wt % (based on $SiO_2$), and then heated to 80° C. and aged for 4 h. Ammonium ion exchange was conducted according to the method in Example 1 to obtain a mesopore material in a gel state, which is abbreviated to be N6. N6 was then dried at 120° C. for 15 h, and calcined at 600° C. for 3 h to obtain the upgrading catalyst containing 100 wt % of the mesopore material, which is abbreviated to be C6. The element analysis weight chemical formula of such sample is $0.1Na_2O.3.1BaO.6.1Al_2O_3.90.7SiO_2$, and the physicochemical parameters thereof, such as specific surface, pore volume and the like, are listed in Table 1.

TABLE 1

| Samples | Specific surface area, $m^2/g$ | Pore volume, ml/g | Average pore diameter, nm | Most probable pore size, nm |
|---|---|---|---|---|
| C1 | 342 | 1.09 | 11.8 | 10 |
| C2 | 325 | 1.16 | 13.5 | 12 |
| C3 | 380 | 1.01 | 12.5 | 11 |
| C4 | 394 | 0.64 | 8.5 | 7 |
| C5 | 281 | 1.07 | 14.2 | 13 |
| C6 | 237 | 1.35 | 15.8 | 14 |

Comparative Example 1

This comparative example shows the comparative catalyst of $V_2O_5$-containing mesopore material and the process for preparing the same.

The process according to Example 1 was used to prepare a catalyst. The difference lay in replacing calcium chloride with vanadium oxalate, to obtain a comparative catalyst containing 100 wt % of vanadium-containing mesopore material abbreviated to be CB1. The element analysis weight chemical composition of such sample is $0.2Na_2O.9.8V_2O_5.19.8Al_2O_3.70.2SiO_2$.

Comparative Example 2

This comparative example shows the comparative catalyst of $TiO_2$-containing mesopore material and the process for preparing the same.

The process according to Example 1 was used to prepare a catalyst. The difference lay in replacing calcium chloride with titanium tetrachloride, to obtain a comparative catalyst containing 100 wt % of vanadium-containing mesopore material abbreviated to be CB2. The element analysis weight chemical composition of such sample is $0.2Na_2O.9.8TiO_2.19.8Al_2O_3.70.2SiO_2$.

Examples 7-9 show the catalyst for catalytically upgrading inferior crude oil provided in the present invention, as well as the process for preparing the same.

Example 7

1.7 L of hydrochloric acid was diluted with 8.0 Kg of decationized water. 7.7 kg of sodium water glass was diluted with 8.0 Kg of decationized water. Under the stirring condition, the diluted sodium water glass was slowly added to the aforesaid dilute hydrochloric acid solution, to obtain a silica sol having a $SiO_2$ concentration of 7.8 wt % and a pH of 2.8. 5.4 Kg of halloysite was added to the aforesaid silica sol, and stirred for 1 h to sufficiently disperse kaolin.

4.0 Kg (dry basis) of the mesopore material C1 prepared according to Example 1 was added to 6.8 Kg of decationized water. Then the solution was sufficiently dispersed with a homogenizer, and adjusted to a pH of 3.5 with dilute hydrochloric acid. The mesopore material slurry was added to the aforesaid silica sol-clay slurry and stirred for 0.5 h, to obtain a catalyst slurry having a solid content of 22.3 wt % and a pH of 2.9. Such slurry was spray-dried at 250° C., washed, dried and calcined to obtain an upgrading catalyst consisting of 40 wt % of the mesopore material, 40 wt % of kaolin and 20 wt % of $SiO_2$ binder, which is abbreviated to be C7.

Example 8

4.1 Kg of halloysite was added to 18 Kg of decationized water and slurried. 4.8 Kg of pseudo-boehmite was added therein, and hydrochloric acid was used to adjust the pH thereof to 2. After homogeneous stirring, the mixture was kept at 70° C. and aged for 1 h. Then 4.7 Kg of alumina sol was added and homogeneously stirred, and the precursor of the thermotolerant inorganic oxides added before and after aging step enabled the weight ratio of the thermotolerant inorganic oxides added before and after aging step to be 1:0.33.

3.0 Kg (dry basis) of the mesopore material C2 prepared according to Example 2 was added to 5.5 Kg of decationized water. Then the solution was sufficiently dispersed with a homogenizer, and adjusted to a pH of 3.5 with dilute hydrochloric acid. The mesopore material slurry was added to the aforesaid alumina-clay slurry and stirred for 0.5 h, to obtain a catalyst slurry having a solid content of 23.5 wt %. Such slurry was spray-dried at 250° C., washed, dried and calcined to obtain an upgrading catalyst consisting of 30 wt % of the mesopore material, 30 wt % of kaolin and 40 wt % of $Al_2O_3$ binder, which is abbreviated to be C8.

Example 9

6.8 Kg of halloysite was added to 24 Kg of decationized water and slurried. 4.8 Kg of pseudo-boehmite was added therein, and hydrochloric acid was used to adjust the pH thereof to 2. After homogeneous stirring, the mixture was kept at 70° C. and aged for 1 h. Then 2.0 Kg (dry basis) of the mesopore material N3 in a gel state prepared according to Example 3 was added and homogeneously stirred, to obtain a slurry having a solid content of 18.3 wt %. Such slurry was spray-dried at 250° C., washed, dried and calcined to obtain a upgrading catalyst consisting of 20 wt % of the mesopore material, 50 wt % of kaolin and 30 wt % of $Al_2O_3$ binder, which is abbreviated to be C9.

Comparative Example 3

This comparative example shows the comparative catalyst containing no mesopore material and the process for preparing the same.

The process according to Example 7 was used to prepare a catalyst. The difference lay in adding no mesopore material. The amount of halloysite was 10.8 kg. Thus a comparative catalyst abbreviated to be CB3 and containing 80 wt % of kaolin and 20 wt % of $SiO_2$ binder was obtain.

Examples 10-12

Examples 10-12 show the catalytically upgrading effect of the catalytically upgrading catalyst provided in the present invention.

With 100% steam, the upgrading catalysts C1-C3 were aged at 800° C. for 17 h, and fed into the reactor of a small-scale fixed fluidized bed apparatus. Crude oil A as shown in Table 2 was introduced, and reacted at a reaction temperature of 400° C., a catalyst/oil weight ratio of 5 and a weight hourly space velocity of 16 $h^{-1}$. The liquid phase product was collected after reaction. Then the product distribution, acid number, carbon residue and metal contents were analyzed, and the upgrading effect of the upgrading catalyst was reviewed. The results can be found in Table 3.

The deacidification rate is calculated according to the following formula:

Deacidification rate=(Total acid number of highly acidic crude oil−Total acid number of the resulted liquid phase product)/Total acid number of highly acidic crude oil×100%.

Comparative Examples 4-5

Comparative examples 4-5 show the catalytically upgrading effect of the comparative catalyst.

Aging was conducted according to the process of Example 10, and the catalytic performance of the catalyst was evaluated. The difference thereof lay in respectively replacing the catalyst C1 provided in the present invention with the comparative catalysts CB1 and CB2 as stated in Comparative Examples 1 and 2. The results can be found in Table 3.

Examples 13-15

Examples 13-15 show the catalytically upgrading effect of the catalytically upgrading catalyst provided in the present invention.

The upgrading catalysts C4-C6 were respectively metal-contaminated, wherein the contaminant amounts are respectively Fe: 20000 ppm, Ni: 30000 ppm, and Ca: 10000 ppm. The contaminated upgrading catalysts were aged with 100% steam at 800° C. for 8 h, and fed into the reactor of a small-scale fixed fluidized bed apparatus. Crude oil B as shown in Table 2 was introduced, and reacted at a reaction temperature of 400° C., a catalyst/oil weight ratio of 5 and a weight hourly space velocity of 16 $h^{-1}$. The liquid phase product was collected after reaction. Then the product distribution, acid number, carbon residue and metal contents were analyzed, and the upgrading effect of the upgrading catalyst was reviewed. The results can be found in Table 4.

Examples 16-18

Examples 16-18 show the catalytically upgrading effect of the catalytically upgrading catalyst provided in the present invention.

The upgrading catalysts C7-C9 were respectively metal-contaminated, wherein the contaminant amounts are respectively Fe: 20000 ppm, Ni: 30000 ppm, and Ca: 10000 ppm. The contaminated upgrading catalysts were aged with 100% steam at 800° C. for 17 h, and fed into the reactor of a small-scale fixed fluidized bed apparatus. Crude oil A as shown in Table 2 was introduced, and reacted at a reaction temperature of 450° C., a catalyst/oil weight ratio of 5 and a weight hourly space velocity of 10 $h^{-1}$. The liquid phase product was collected after reaction. Then the product distribution, acid number, carbon residue and metal contents were analyzed, and the upgrading effect of the upgrading catalyst was reviewed. The results can be found in Table 5.

Comparative Example 6

Comparative Example 6 shows the catalytically upgrading effect of the comparative catalyst.

Contamination and aging was conducted according to the process of Example 16, and the catalytic performance of the catalyst was evaluated. The difference thereof lay in replacing the catalyst C7 provided in the present invention with the comparative catalyst CB3 as stated in Comparative Example 3. The results can be found in Table 5.

TABLE 2

| | Crude oil A | Crude oil B |
|---|---|---|
| Density (20° C.), g/cm$^3$ | 0.9246 | 0.9224 |
| Kinematic viscosity(50° C.), mm$^2$/s | 77.93 | 382.8 |
| Kinematic viscosity(80° C.), mm$^2$/s | 23.61 | 96.96 |
| Pour point, ° C. | <−50° C. | 8° C. |
| Molecular weight | 408 | 580 |
| Conradson carbon residue, wt % | 5.41 | 6.22 |
| Refractive index, (20° C.) | 1.5196 | 1.5221 |
| Resin | 17.6% | 16.5% |
| Asphaltene | 0.4% | 0.1% |
| Water content | trace | 0.1% |
| Total acid number, mgKOH/g | 3.37 | 5.56 |
| Elementary composition, wt % | | |
| C | 86.62 | 86.68 |
| H | 11.94 | 12.41 |
| N | 0.35 | 0.28 |
| S | 0.31 | 0.12 |
| H/C(mol/mol) | 1.65 | 1.72 |
| Metal content, ppm | | |
| Ni | 31.1 | 14.7 |
| V | 1 | 0.5 |
| Fe | 20 | 45.9 |
| Ca | 11.1 | 777 |
| Distillation range, ° C. | | |
| IBP | 115 | 114 |
| 5 vol % | 272 | 306 |
| 10 vol % | 317 | 367 |
| 20 vol % | 411 | 463 |
| 30 vol % | 486 | 537 |
| 38 vol % | | 584 |
| 40 vol % | 584 | |

TABLE 3

| | | Example No. | | | | |
|---|---|---|---|---|---|---|
| | Crude oil A | Example 10 | Example 11 | Example 12 | Comp. Example 4 | Comp. Example 5 |
| Upgrading catalyst | — | C1 | C2 | C3 | CB1 | CB2 |
| Total acid number, mgKOH/g | 3.37 | 0.25 | 0.33 | 0.16 | 1.66 | 1.54 |
| Deacidification rate, % | — | 92.6 | 90.2 | 95.3 | 50.7 | 54.3 |
| Conradson carbon residue, wt % | 5.41 | 0.9 | 1.5 | 1.3 | 1.8 | 1.1 |
| Metal content, ppm | | | | | | |
| Ni | 31.1 | 1.8 | 2.1 | 1.9 | 2.5 | 2.3 |
| Fe | 20.0 | 1.5 | 1.3 | 1.7 | 1.6 | 1.7 |
| Ca | 11.1 | 6.2 | 5.4 | 4.8 | 5.2 | 5.0 |
| Product distribution, wt % | | | | | | |
| Dry gas | | 0.15 | 0.21 | 0.19 | 0.12 | 0.14 |
| LPG | | 2.35 | 2.00 | 2.82 | 1.94 | 2.28 |
| Gasoline | | 12.39 | 11.00 | 13.39 | 10.42 | 12.13 |
| Diesel oil | | 16.82 | 17.67 | 17.16 | 17.49 | 16.60 |
| Heavy oil | | 63.45 | 64.68 | 61.78 | 65.77 | 64.13 |
| Coke | | 4.84 | 4.44 | 4.66 | 4.26 | 4.72 |
| Conversion, wt % | | 19.73 | 17.65 | 21.06 | 16.74 | 19.27 |

According to Table 3, it can be seen that, after the inferior crude oil is pretreated with the catalytically upgrading catalyst provided in the present invention, the upgraded crude oil has a deacidification rate of greater than 90%; the conradson carbon number is reduced by more than 72.3%; the metal Ni is removed by 93.2%; the metal Fe is removed by more than 91.5%; Ca is removed by more than 44.1%.

TABLE 4

| | Crude oil B | Example No. Example 13 | Example 14 | Example 15 |
|---|---|---|---|---|
| Upgrading catalyst | — | C4 | C5 | C6 |
| Total acid number, mgKOH/g | 5.56 | 0.36 | 0.13 | 0.41 |
| Deacidification rate, % | — | 93.5 | 97.7 | 92.6 |
| Conradson carbon residue, wt % | 6.22 | 2.1 | 1.4 | 1.9 |
| Metal content, ppm | | | | |
| Ni | 14.7 | 0.8 | 1.1 | 1.2 |
| Fe | 45.9 | 2.6 | 2.2 | 2.7 |
| Ca | 777 | 246 | 284 | 261 |
| Product distribution, wt % | | | | |
| Dry gas | | 0.20 | 0.17 | 0.16 |
| LPG | | 1.64 | 0.91 | 0.76 |
| Gasoline | | 7.42 | 7.48 | 7.13 |
| Diesel oil | | 19.49 | 19.59 | 20.92 |
| Heavy oil | | 66.42 | 66.59 | 66.05 |
| Coke | | 4.83 | 5.26 | 4.98 |
| Conversion, wt % | | 14.09 | 13.82 | 13.03 |

TABLE 5

| | Example No. Example 16 | Example 17 | Example 18 | Comp. Example 6 |
|---|---|---|---|---|
| Upgrading catalyst | C7 | C8 | C9 | CB3 |
| Total acid number, mgKOH/g | 0.15 | 0.05 | 0.06 | 1.77 |
| Deacidification rate, % | 95.5 | 98.5 | 98.2 | 47.5 |
| Conradson carbon residue, wt % | 1.7 | 1.0 | 1.2 | 3.9 |
| Metal content, ppm | | | | |
| Ni | 2.7 | 0.6 | 0.5 | 12.3 |
| Fe | 2.1 | 1.4 | 1.5 | 8.6 |
| Ca | 5.3 | 6.6 | 3.5 | 9.6 |
| Product distribution, wt % | | | | |
| Dry gas | 0.62 | 0.58 | 0.51 | 0.39 |
| LPG | 1.05 | 1.37 | 1.19 | 0.82 |
| Gasoline | 7.88 | 9.77 | 9.71 | 6.74 |
| Diesel oil | 16.14 | 17.23 | 15.28 | 13.72 |
| Heavy oil | 69.22 | 65.57 | 68.08 | 73.54 |
| Coke | 5.09 | 5.48 | 5.23 | 4.79 |
| Conversion, wt % | 14.64 | 17.20 | 16.64 | 12.74 |

According to Table 5, it can be seen that, after the catalytically upgrading catalyst provided in the present invention is contaminated by metals, it still has a deacidification rate of greater than 95.5%, greatly higher than 47.5% in the comparative example. In addition, the conradson carbon number is reduced by 68.6% which is 40.7% higher than that in the comparative example; the metal Ni is removed by 91.3% which is 30.9% higher than that in the comparative example; the metal Fe is removed by more than 89.5% which is 32.5% higher than that in the comparative example; Ca is removed by more than 52.3% which is 38.7% higher than that in the comparative example.

The invention claimed is:

1. A process for upgrading inferior acid-containing crude oil using (i) a mesopore material characterized in that said mesopore material is an amorphous material containing alkaline earth oxide, silica and alumina, and has an anhydrous chemical formula of $(0\text{-}0.3)Na_2O.(1\text{-}50)MO.(6\text{-}58)Al_2O_3.(40\text{-}92)SiO_2$, based on the weight percent of the oxides, wherein M is one or more selected from Mg, Ca and Ba; and said mesopore material has a specific surface area of 200-400 $m^2/g$, a pore volume of 0.5-2.0 ml/g, an average pore diameter of 8-20 nm, or (ii) a catalytically upgrading catalyst characterized in that the catalyst comprises 1-95 wt % of the mesopore material of (i), 0-99 wt % of thermotolerant inorganic oxides, and 0-70 wt % of clays, based on the total amount of the catalyst, comprising preheating the crude oil to 100-250° C., introducing into the reactor and contacting with the mesopore material of (i), or the catalytically upgrading catalyst of (ii) for the catalytic upgrading, separating the reaction oil and gas and the coked catalyst after the reaction, wherein the separated reaction gas and oil is subjected to the subsequent separation to obtain a portion of light products and the deacidified and demetallized crude oil; and the separated catalyst is recycled after regeneration by stripping and charring.

2. The process according to claim 1, characterized in that said catalytic upgrading is conducted at a reaction temperature of 300-600° C., a reaction pressure of 0.15-0.4Mpa, a weight hourly space velocity of 1-150 $h^{-1}$, and a mass ratio of 1-30 of the catalyst to the hydrocarbon oil.

3. The process according to claim 2, characterized in that said catalytic upgrading is conducted at a reaction temperature of 350-520° C., a reaction pressure of 0.15-0.35Mpa, a weight hourly space velocity of 1-100 $h^{-1}$, and a mass ratio of 2-15 of the catalyst to the hydrocarbon oil.

4. The process according to claim 1, characterized in that said crude oil has a total acid number of greater than 0.5 mgKOH/g, and a conradson carbon number of greater than 3 wt %.

5. The process according to claim 4, characterized in that said crude oil has a total acid number of greater than 1 mgKOH/g, and a conradson carbon number of greater than 5 wt %, a Ni content of greater than 10 μg/g, a Fe content of greater than 10 μg/g, and a Ca content of greater than 10 μg/g.

* * * * *